(12) United States Patent
Kitamura et al.

(10) Patent No.: US 10,338,749 B2
(45) Date of Patent: Jul. 2, 2019

(54) OPTICAL DEVICE AND OPERATION INPUT APPARATUS

(71) Applicant: OMRON Corporation, Kyoto-shi, Kyoto (JP)

(72) Inventors: Norikazu Kitamura, Osaka (JP); Masayuki Shinohara, Nagaokakyo (JP); Yuji Hirose, Kyotanabe (JP); Yasuhiro Tanoue, Otsu (JP); Mitsuru Okuda, Kusatsu (JP); Kazuyuki Okada, Ritto (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 15/538,842

(22) PCT Filed: Dec. 28, 2015

(86) PCT No.: PCT/JP2015/086572
§ 371 (c)(1),
(2) Date: Jun. 22, 2017

(87) PCT Pub. No.: WO2016/114102
PCT Pub. Date: Jul. 21, 2016

(65) Prior Publication Data
US 2017/0371493 A1    Dec. 28, 2017

(51) Int. Cl.
*G06F 3/042* (2006.01)
*G02B 27/22* (2018.01)
(Continued)

(52) U.S. Cl.
CPC ............ *G06F 3/0421* (2013.01); *G01S 17/08* (2013.01); *G02B 3/08* (2013.01); *G02B 6/003* (2013.01);
(Continued)

(58) Field of Classification Search
CPC .......... G06F 3/041; G06F 3/042–0428; G01S 17/08–325; H04N 13/388–395;
(Continued)

(56) References Cited

U.S. PATENT DOCUMENTS 6,144,480 A    11/2000 Li et al.
2007/0279391 A1    12/2007 Marttila et al.
(Continued)

FOREIGN PATENT DOCUMENTS

CN    102193686 A    9/2011
JP    2000-510603 A    8/2000
(Continued)

OTHER PUBLICATIONS

The International Search Report of PCT/JP2015/086572 dated Mar. 8, 2016.

*Primary Examiner* — Nathan Danielsen
(74) *Attorney, Agent, or Firm* — Metrolexis Law Group, PLLC (57) ABSTRACT

An optical device includes a light-guiding plate that guides light in a plane parallel to an emission surface that emits light, and a sensor for detecting an object located on an emission surface side using light that passes through a back surface opposite to the emission surface and through the emission surface. The light-guiding plate has light convergence portions that receive light guided by the light-guiding plate and each have optical surfaces that cause light to be emitted from the emission surface in directions in which the light substantially converges at or scatters from one convergence point or one convergence line in a space, and the convergence points or the convergence lines for the light convergence portions are different from each other, and an (Continued)

image is formed in the space on the emission surface side by a collection of the convergence points or the convergence lines.

13 Claims, 6 Drawing Sheets

(51) Int. Cl.
　　*G02B 3/08*　　　　(2006.01)
　　*G01S 17/08*　　　(2006.01)
　　*F21V 8/00*　　　　(2006.01)
　　*H04N 13/388*　　(2018.01)

(52) U.S. Cl.
　　CPC ......... *G02B 6/005* (2013.01); *G02B 27/2214* (2013.01); *H04N 13/388* (2018.05)

(58) Field of Classification Search
　　CPC .......... G02B 3/02; G02B 3/08; G02B 6/0023; G02B 6/003; G02B 6/005–0055; G02B 27/22; G02B 27/2214; G02B 27/2221
　　See application file for complete search history.

(56) References Cited

U.S. PATENT DOCUMENTS

| | | | |
|---|---|---|---|
| 2010/0283838 A1* | 11/2010 | Tomisawa | G02B 27/0093 348/51 |
| 2011/0221705 A1* | 9/2011 | Yi | G06F 3/0425 345/175 |
| 2011/0255303 A1* | 10/2011 | Nichol | G02B 6/006 362/606 |
| 2014/0211506 A1* | 7/2014 | Nakagome | G02B 6/0036 362/613 |
| 2014/0268327 A1 | 9/2014 | Dunn et al. | |
| 2015/0185323 A1* | 7/2015 | Chikaoka | G06F 3/0423 356/615 |

FOREIGN PATENT DOCUMENTS

| | | |
|---|---|---|
| JP | 2001-255493 A | 9/2001 |
| JP | 2008-275922 A | 11/2008 |
| JP | 2009-540440 A | 11/2009 |
| JP | 2012-8464 A | 1/2012 |
| JP | 5509391 B1 | 6/2014 |
| JP | 2015-125264 A | 7/2015 |
| WO | 2007/013215 A1 | 2/2007 |
| WO | 2013/047774 A1 | 4/2013 |

* cited by examiner

OPTICAL DEVICE AND OPERATION INPUT APPARATUS

TECHNICAL FIELD

The present invention relates to an optical device and an operation input apparatus.

RELATED ART

A stereoscopic display apparatus is known that includes a light-guiding plate, a light source, and a mask or a lens array that is disposed on the front surface of the light-guiding plate and uses a parallax barrier system or a lens array system (see Patent Document 1, for example). Also, a steric two-dimensional image display apparatus is known that includes a display unit having a flat image display surface that displays a two-dimensional image including a stereoscopic image, and an image transmission panel that is spaced apart from and in parallel to the image display surface, includes a microlens array that includes a plurality of lenses and has an effective area that is wider than the area of the stereoscopic image in the two-dimensional image and a lens frame region surrounding the effective region of the microlens array, the image transmission panel producing an image plane that displays an actual image for the two-dimensional image in a space located on the side opposite to the display unit of the microlens array (see Patent Document 2, for example).

Patent Document 1: JP 2012-008464A
Patent Document 2: JP 2001-255493A

SUMMARY OF THE INVENTION

Problem to be Solved by the Invention

If a mask or a lens array is used, there are cases where it is difficult to provide an optical sensor that detects an object, on a back surface opposite to an emission surface of the light-guiding plate. For example, if the mask is used, detection light for detecting the object is substantially blocked by the mask in some cases. Also, for example, if the lens array is used, detection light is significantly scattered by the lens array in some cases.

Means for Solving the Problems

In a first aspect, an optical device includes a light-guiding plate that guides light in a plane parallel to an emission surface that emits light, and a sensor for detecting an object located on an emission surface side using light that passes through a back surface opposite to the emission surface and through the emission surface, the sensor being provided on the side opposite to the emission surface with respect to the light-guiding plate, in which the light-guiding plate has a plurality of light convergence portions that receive light guided by the light-guiding plate and each have optical surfaces that cause light to be emitted from the emission surface in directions in which the light substantially converges at one convergence point or one convergence line in a space, or substantially scatters from one convergence point or one convergence line in the space, and the convergence points or the convergence lines for the plurality of light convergence portions are different from each other, and an image is formed in the space on the emission surface side by a collection of a plurality of the convergence points or the convergence lines.

The plurality of light convergence portions may be formed along lines that are determined in advance in the plane parallel to the emission surface.

The plurality of light convergence portions may form the image showing a position at which a user operation is accepted, in at least one of a detection range in which the sensor can detect an object in the space on the emission surface side, and the vicinity of the detection range.

The sensor may have a light reception portion that receives light from a position in the space on the emission surface side through the emission surface and the back surface.

The sensor may further include a light projection portion that projects light to the space on the emission surface side, through the emission surface and the back surface. If the object is present in a predetermined range in a light path of the light projected from the light projection portion to the space on the emission surface side, the light reception portion may receive reflected light that has been projected from the light projection portion and has been reflected by the object.

The plurality of light convergence portions may form the image showing a position at which a user operation is accepted, in at least one of the predetermined range in the space on the emission surface side, and the vicinity of the predetermined range.

The optical device may further include a plurality of cylindrical lenses that are provided on the emission surface side of the light-guiding plate at positions corresponding to the plurality of light convergence portions, and each restrict a spread of light emitted from the corresponding light convergence portion, the light having been guided by the light-guiding plate and emitted from the emission surface.

The sensor may detect the object using light extending along a plane that is orthogonal to the emission surface and parallel to a direction in which the plurality of cylindrical lenses extend.

The plurality of cylindrical lenses may extend along a direction orthogonal to a direction in which the light-guiding plate guides light.

The plurality of cylindrical lenses may extend along a direction in which the light-guiding plate guides light.

In a second aspect, an operation input apparatus includes the above-described optical device, and a determination unit that determines, if an object located on the emission surface side is detected by the sensor, that the object is located at a position at which the user operation is accepted.

Note that the above-described summary of the invention does not describe all of the features of the present invention. Also, the invention encompasses sub-combinations of these groups of features.

EMBODIMENTS OF THE INVENTION

Although the present invention will be described by way of an embodiment of the invention hereinafter, the following embodiment does not limit the invention according to the claims. Also, all combinations of features described in the embodiment are not necessarily essential for the means for solving the problem of the invention.

Figure 1:
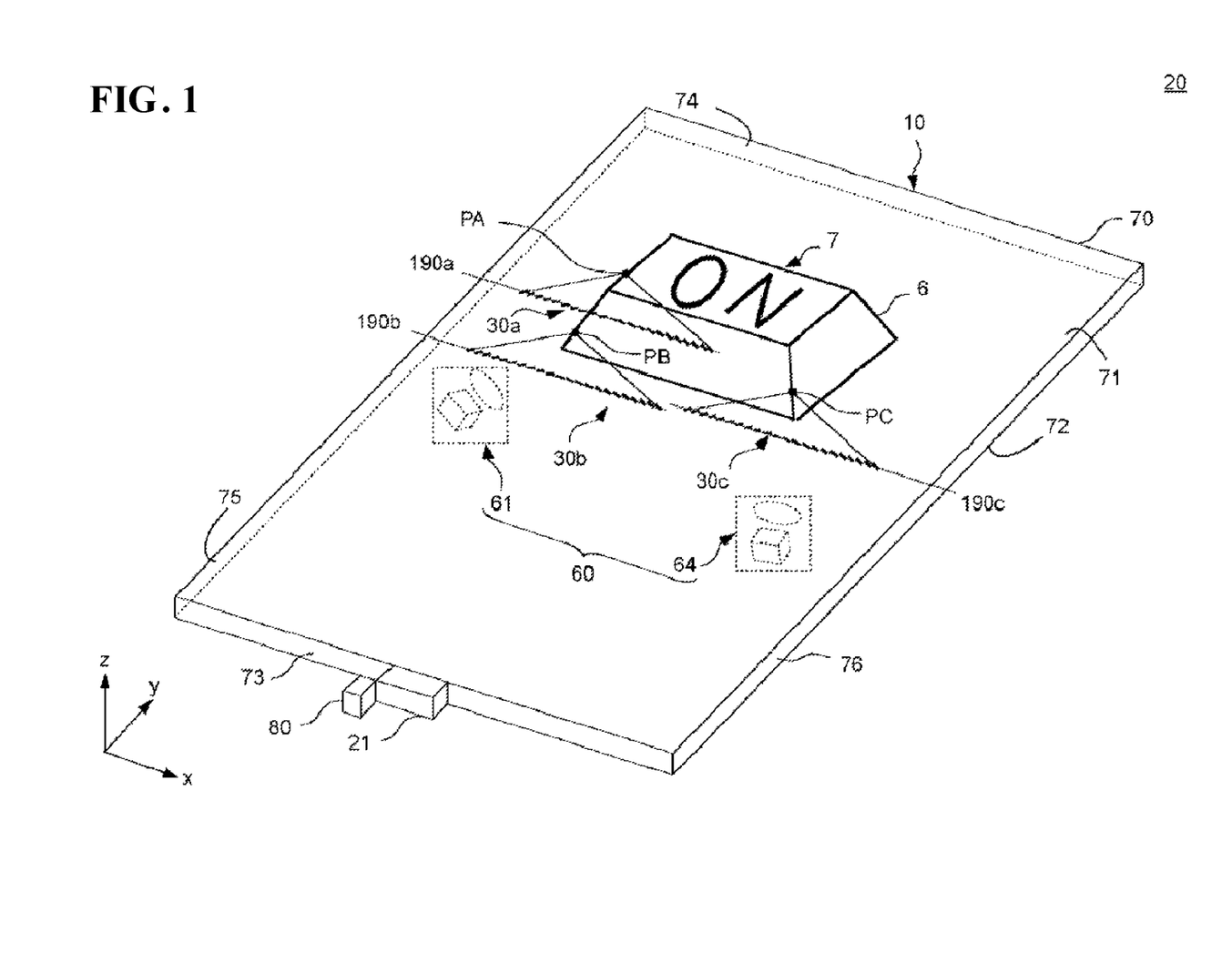
FIG. 1 schematically shows an operation input apparatus 20 of one embodiment together with a stereoscopic image projected to a space.

FIG. 1 schematically shows an operation input apparatus 20 in one embodiment together with a stereoscopic image projected to a space. The operation input apparatus 20 has a display apparatus 10, a sensor 60, and a control unit 80. The operation input apparatus 20 functions as a virtual switch. Note that for the purpose of facilitating understanding of the description, the drawings used to describe the embodiment are schematic or illustrative drawings. There are cases where the drawings used to describe the embodiment are not depicted in the actual scale.

The display apparatus 10 emits light that forms an image 6 of the virtual switch. The image 6 is a stereoscopic image recognized by a user in the space. The image 6 includes a partial image 7 that displays an operation surface recognized in the space. The sensor 60 detects an object located in the vicinity of the partial image 7. As one example, the object indicates a finger 90 of the user. When the sensor 60 detects the object in the vicinity of the partial image 7, the display apparatus 10 outputs signals indicating that the virtual switch was pushed, to the outside.

The display apparatus 10 has an emission surface 71 that emits light. The display apparatus 10 forms the image 6 as a stereoscopic image using light emitted from the emission surface 71. Note that the stereoscopic image refers to an image recognized to be located at a position that is different from the position of the emission surface 71 of the display apparatus 10. The stereoscopic image includes a two-dimensional image recognized at a position spaced apart from the emission surface 71 of the display apparatus 10, for example. That is, the stereoscopic image includes not only an image recognized as a stereoscopic shape but also an image having a two-dimensional shape recognized at a position that is different from the position on the emission surface 71 of the display apparatus 10.

The display apparatus 10 includes a light-guiding plate 70 and a light source 21. The light source 21 is an LED light source, for example. The light-guiding plate 70 is made from a transparent resin material having a relatively high refractive index. The material for forming the light-guiding plate 70 may be a polycarbonate resin (PC), a polymethyl methacrylate resin (PMMA), glass, or the like.

The light-guiding plate 70 has a back surface 72 opposite to the emission surface 71. Also, the light-guiding plate 70 has an end surface 73, an end surface 74, an end surface 75, and an end surface 76, which are the four end surfaces of the light-guiding plate 70. The end surface 73 is a light-entering end surface of the light-guiding plate 70. The end surface 73 is provided with the light source 21, and light emitted from the light source 21 enters the light-guiding plate 70 from the end surface 73. The end surface 74 is opposite to the end surface 73. The end surface 76 is a surface opposite to the end surface 75. The light-guiding plate 70 spreads and guides light emitted from the light source 21 in a planar shape in the plane parallel to the emission surface 71.

In the description of the embodiment, a right-handed orthogonal coordinate system having an x axis, a y axis, and a z axis is used in some cases. The z-axis direction is defined as a direction perpendicular to the emission surface 71. The direction from the back surface 72 to the emission surface 71 is defined as the z-axis positive direction. Also, the y-axis direction is defined as a direction perpendicular to the end surface 73. The direction from the end surface 73 to the end surface 74 is defined as the y-axis positive direction. The x axis is a direction perpendicular to the end surface 75 and the end surface 76, and the direction from the end surface 75 to the end surface 76 is defined as the x-axis positive direction. Note that in order to avoid redundancy, the plane parallel to the xy flat plane is called the "xy plane", the plane parallel to the yz flat plane is called the "yz plane", and the plane parallel to the xz flat plane is called the "xz plane" in some cases.

Figure 2:
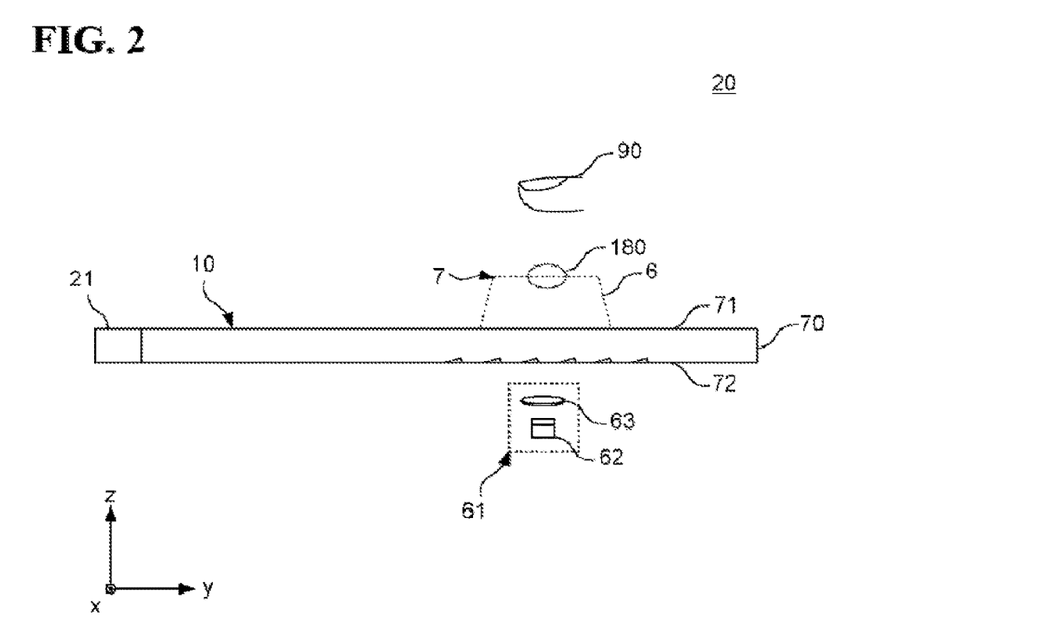
FIG. 2 schematically shows the cross-section of the operation input apparatus 20 in the yz plane.
Figure 3:
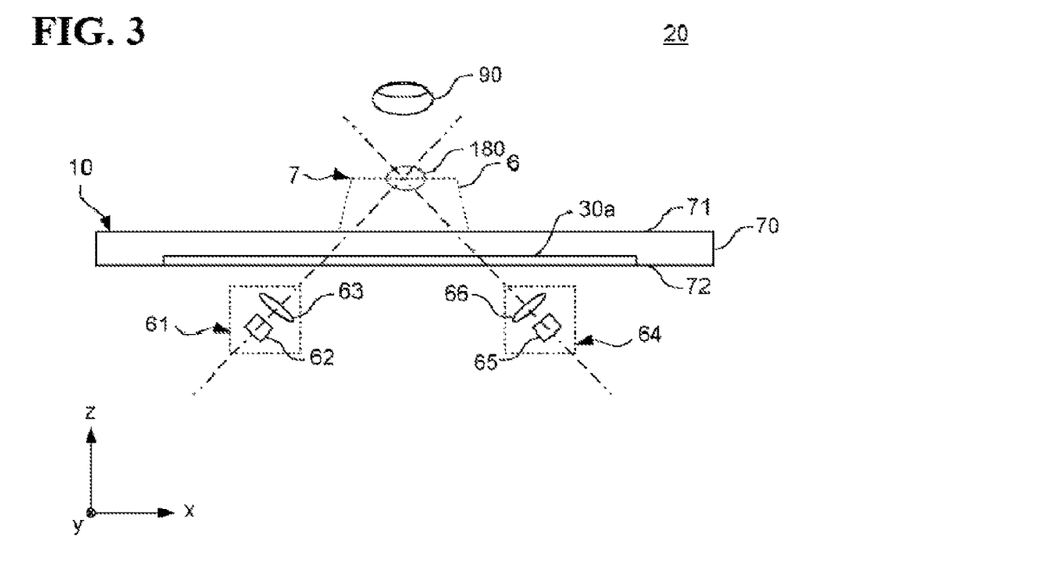
FIG. 3 schematically shows the cross-section of the operation input apparatus 20 in the xz plane.

FIG. 2 schematically shows the cross-section of the operation input apparatus 20 in the yz plane. FIG. 3 schematically shows the cross-section of the operation input apparatus 20 in the xz plane.

The back surface 72 of the light-guiding plate 70 is provided with a plurality of light convergence portions 30 including a light convergence portion 30a, a light convergence portion 30b, and a light convergence portion 30c. The light convergence portions 30 are each substantially continuous in the x-axis direction. Light guided by the light-guiding plate 70 enters the positions in the x-axis direction of the light convergence portions 30. The light convergence portions 30 make light that enters the positions of the light convergence portions 30 substantially converge at fixed points corresponding to the light convergence portions 30. In particular, FIG. 1 shows a light convergence portion 30a, a light convergence portion 30b, and a light convergence portion 30c as some of the light convergence portions 30, and shows a situation in which a plurality of light rays emitted from the light convergence portion 30a, the light convergence portion 30b, and the light convergence portion 30c converge at the light convergence portion 30a, the light convergence portion 30b, and the light convergence portion 30c.

Specifically, the light convergence portion 30a corresponds to a fixed point PA on the image 6. The light rays emitted from positions in the light convergence portion 30a converge at the fixed point PA. Therefore, the wave surface of light emitted from the light convergence portion 30a is a wave surface of light that appears to be emitted from the fixed point PA. The light convergence portion 30b corresponds to a fixed point PB on the image 6. The light rays emitted from positions in the light convergence portion 30b converge at the fixed point PB. In this manner, the light rays emitted from positions in any light convergence portion 30 substantially converge at a fixed points corresponding to that light convergence portion 30. Accordingly, a wave surface of light that appears to be emitted from a corresponding fixed point can be provided by any light convergence portion 30. The fixed points corresponding to the light convergence portions 30 are different from each other, and the image 6 recognized in the space is formed by a collection of fixed points corresponding to the light convergence portions 30. In this manner, the display apparatus 10 projects a stereoscopic image to the space.

In the present embodiment, the light convergence portions 30 each include multiple reflection surfaces that are substantially continuous in the x-axis direction. The surface density of the reflection surfaces on the back surface 72 is preferably less than or equal to 30%. The light that is reflected by the reflection surfaces of any light convergence portion 30 converges at a fixed point corresponding to that light convergence portion 30. For example, a plurality of light rays that are reflected by the plurality of reflection surfaces of the light convergence portion 30a converge at the fixed point PA. Also, a plurality of light rays that are reflected by the plurality of reflection surfaces of the light convergence portion 30b converge at the fixed point PB. Also, a plurality of light rays that are reflected by the plurality of reflection surfaces of the light convergence portion 30c converge at the fixed point PC.

In the xy plane, light beams that are guided by the light-guiding plate 70 and pass through respective positions in the light-guiding plate 70 have a spread angle that is smaller than a predetermined value and is centered on the direction that connects the position in the light-guiding plate 70 to the light source 21. If the light convergence portion 30 is provided at a position spaced apart from the light source 21, light that is guided by the light-guiding plate 70 and enters the light convergence portion 30 has little spread substantially centered on the y-axis direction. Thus, for example, light emitted from the light convergence portion 30a substantially converges at one fixed point in the plane that includes the fixed point PA and is parallel to the xz plane. Note that in this specification, the spread of a light beam passing through a point located inside or outside of the light-guiding plate refers to the spread of light in the case where this light beam is regarded as light scattering from this point. Also, there are cases where the light beam passing through a point located inside or outside of the light-guiding plate is simply referred to as "spread of light".

Note that when light that enters the light convergence portion 30 has spread in the z-direction, the light emitted from the light convergence portion 30 converges on a line that includes a fixed point in the space and extends along the y axis. However, for the purpose of facilitating understanding of the description of the embodiment, the description will be given focusing on convergence of light in the xz plane, and assuming that light emitted from the light convergence portions 30 converges at fixed points.

As shown in FIG. 1, the light convergence portion 30a is formed along a line 190a. The light convergence portion 30b is formed along a line 190b. The light convergence portion 30c is formed along a line 190c. Here, the line 190a, the line 190b, and the line 190c are straight lines that are approximately parallel to the x axis. Any light convergence portion 30 is substantially continuous along a straight line that is approximately parallel to the x axis.

In this manner, the light convergence portions 30 are formed along predetermined lines in the plane that is parallel to the emission surface 71. Thus, light guided by the light-guiding plate 70 enters the light convergence portions 30, and the light convergence portions 30 cause light to be emitted from the emission surface 71 in directions in which the light substantially converges at one convergence point in the space. Note that if the fixed point is located on the back surface 72 of the light-guiding plate 70, the emitted light becomes light scattered from the fixed point. Thus, if the fixed point is located on the back surface 72 of the light-guiding plate 70, the reflection surfaces of the light convergence portions 30 cause light to be emitted from the emission surface 71 in the directions in which the light substantially scatters from one convergence point in the space. Note that as will be described later, the light convergence portions 30 may be each formed by a part of a Fresnel lens.

The sensor 60 is a limited-reflective optical sensor. The detection range in which the sensor 60 can detect an object is substantially limited to a range 180 in the space on the emission surface 71 side. Specifically, the sensor 60 has a light projection portion 61 and a light reception portion 64. The range 180 is a region in which a projected light beam of the light projection portion 61 and a received light beam of the light reception portion 64 intersect with each other.

More specifically, the light projection portion 61 projects light to the space on the emission surface 71 side. The light projected by the light projection portion 61 is detection light for detecting an object. The detection light emitted from the light projection portion 61 is projected to the space on the emission surface 71 side through the emission surface 71 and the back surface 72.

The light reception portion 64 receives light emitted from a position in the space on the emission surface 71 side through the emission surface 71 and the back surface 72. If an object is present in the predetermined range 180 in the light path of the light that is projected from the light projection portion 61 to the space on the emission surface 71 side, the light reception portion 64 receives light that is projected from the light projection portion 61 and is reflected by the object.

Specifically, the light projection portion 61 has a light emission portion 62 and a light projection lens 63. The light reception portion 64 has a photosensor 65 and a light reception lens 66. The light emission portion 62 emits light that serves as the detection light. The light projection lens 63 makes the spread of light that is emitted from the light emission portion 62 and enters the light projection lens 63 decrease toward the range 180. The light emitted from the light projection lens 63 passes through the light-guiding plate 70 and travels as the detection light to the space on the emission surface 71 side. Note that light projected by the light projection portion 61 may be invisible light such as infrared light. For example, the light emission portion 62 may be an infrared LED. By the light projection portion 61 projecting invisible light, it is possible to suppress recognition of the detection light by the user and to allow the user to recognize only the image 6 of the virtual switch.

If an object is present in the range 180, the detection light is reflected by the object, and the reflected light travels to the light reception portion 64. The reflected light passes through the light-guiding plate 70 and enters the light reception lens 66. The reflected light that has entered the light reception lens 66 is condensed toward the photosensor 65 and enters the photosensor 65. If no object is present in the range 180, the detection light is not reflected by an object, or the reflected light does not enter the light reception portion 64. A control unit 80 acquires signals indicating a light reception amount of light received by the photosensor 65. If the light reception amount exceeds a predetermined threshold value, the control unit 80 determines that the virtual switch was pushed and outputs signals indicating that the virtual switch has been pushed, to an external apparatus. In this manner, if the object located at a position on the emission surface side is detected by the sensor 60, the control unit 80 determines that the object is located at a position at which a user operation is accepted.

Here, the partial image 7 of the image 6 shows an operation surface of the virtual switch. The partial image 7 is one example of the image that displays the position at which the user operation is accepted. The partial image 7 is formed in the range 180. Thus, if an object is located in the vicinity of the partial image 7, the object is detected. Note that the partial image 7 is not necessarily required to be formed in the range 180, and needs only be formed at a position located in the vicinity of the range 180. In this manner, the light convergence portion 30 forms the partial image 7 in at least one of the range 180 in which the sensor 60 can detect the object in the space on the emission surface 71 side, and the vicinity of the range 180 in which the sensor 60 can detect the object. Accordingly, it can be determined that the virtual switch has been pushed.

According to the display apparatus 10, the light-guiding plate 70 is transparent, and thus the sensor 60 that optically detects an object can be provided on the back surface 72 side. Note that the surface density of the reflection surface of the light convergence portion 30 may be less than or equal to 30%. Thus, even if the back surface 72 is provided with the sensor 60, the object can be detected by detection light that pass through the light-guiding plate 70.

Figure 4:
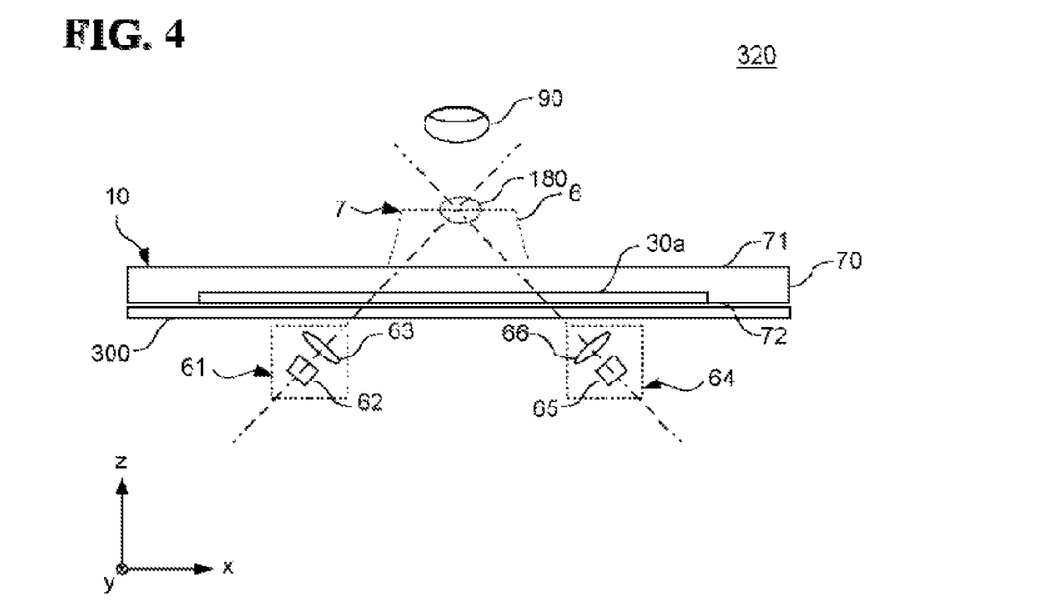
FIG. 4 schematically shows an operation input apparatus 320 as a modification of the operation input apparatus 20.

FIG. 4 schematically shows an operation input apparatus 320 as a modification of the operation input apparatus 20. The operation input apparatus 320 includes a half mirror 300 in addition to the constituent elements included in the operation input apparatus 20.

The half mirror 300 is provided between the sensor 60 and the light-guiding plate 70. Specifically, the half mirror 300 is provided between the back surface 72 of the light-guiding plate 70 and the light projection portion 61 and light reception portion 64. Light projected from the light projection portion 61 passes through the half mirror 300 and is projected to the space on the emission surface 71 side. Reflected light that has been reflected by the object located in the range 180 or in the vicinity of the range 180 passes through the half mirror 300 and enters the light reception portion 64. According to the operation input apparatus 320, the half mirror 300 is provided, and thus it is difficult for the user to visually recognize the sensor 60.

Figure 5:
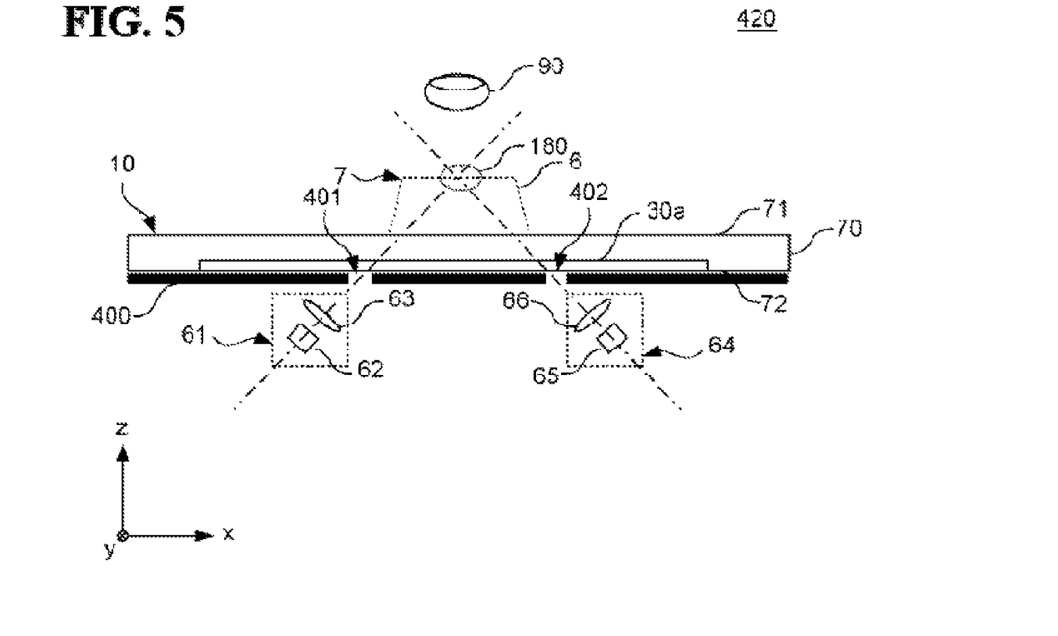
FIG. 5 schematically shows an operation input apparatus 420 as a modification of the operation input apparatus 20.

FIG. 5 schematically shows an operation input apparatus 420 as a modification of the operation input apparatus 20. The operation input apparatus 420 includes a light-blocking plate 400 in addition to the constituent elements included in the operation input apparatus 20.

The light-blocking plate 400 has an opening 401 and an opening 402. The opening 401 is provided in correspondence with the optical axis of light projected from the light projection portion 61. The opening 402 is provided in correspondence with the optical axis of light received by the light reception portion 64. The light projected from the light projection portion 61 passes through the opening 401 and is projected to the space on the emission surface 71 side. The reflected light that has been reflected by the object passes through the opening 402 and enters the light reception portion 64. According to the operation input apparatus 320, the light-blocking plate 400 is provided, and thus it is difficult for the user to visually recognize the sensor 60.

Figure 6:
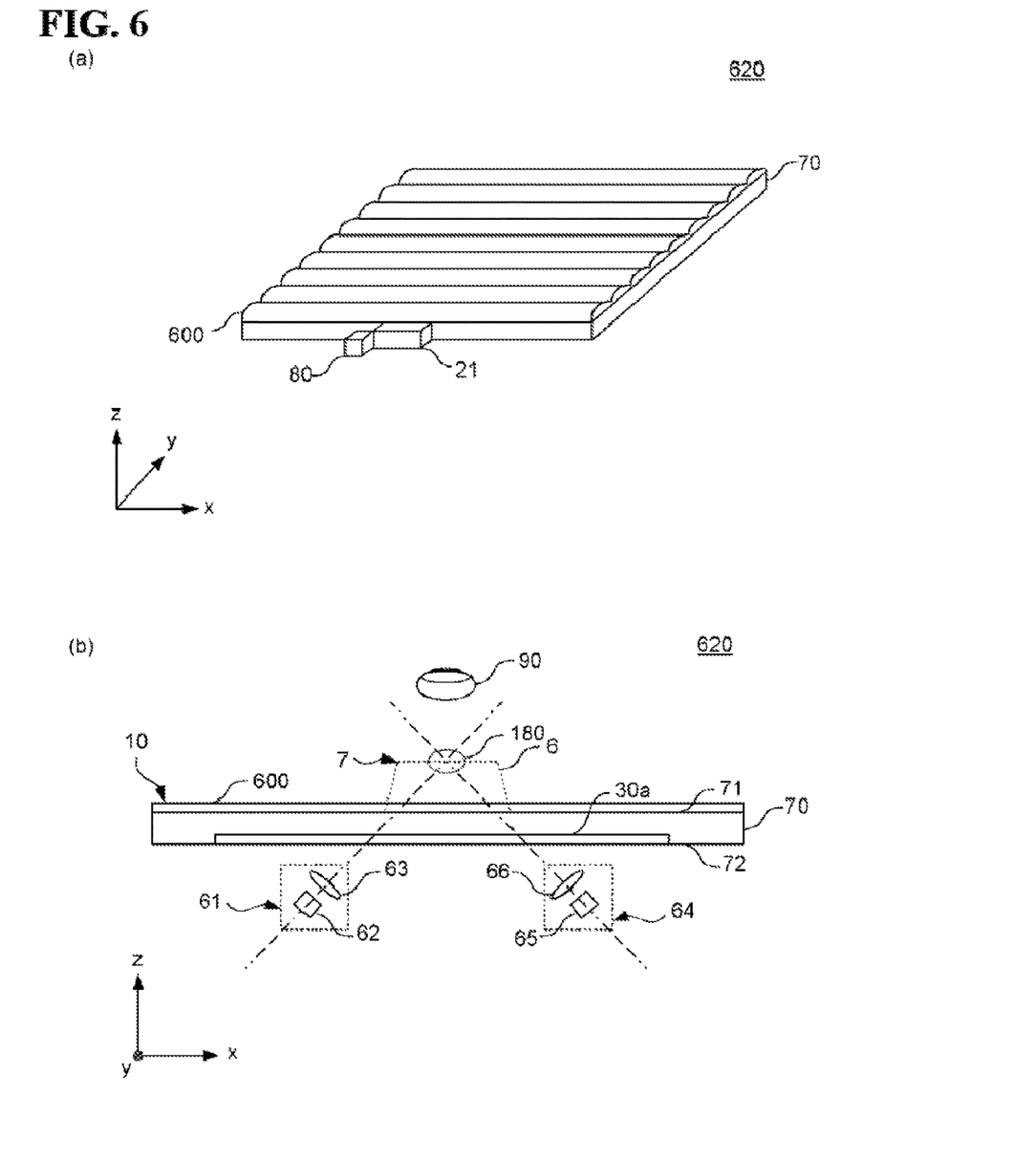
FIG. 6 schematically shows an operation input apparatus 620 as a modification of the operation input apparatus 20.

FIG. 6 schematically shows an operation input apparatus 620 as a modification of the operation input apparatus 20. FIG. 6(a) is a perspective view schematically showing the operation input apparatus 620. FIG. 6(b) is a cross-sectional view of the operation input apparatus 620 in the xz plane.

The operation input apparatus 620 includes cylindrical lenses 600 in addition to the constituent elements included in the operation input apparatus 620. The cylindrical lenses 600 are provided on the emission surface 71 side of the light-guiding plate 70 at positions corresponding to the light convergence portions 30. The plurality of cylindrical lenses 600 extend along the x-axis direction. In this manner, the plurality of cylindrical lenses 600 each extend along the direction orthogonal to a direction in which the light-guiding plate 70 guides light. The plurality of cylindrical lenses 600 are lined up along the y-axis direction.

Reflected light that has been reflected by the reflection surfaces of one light convergence portion 30 is emitted from the emission surface 71 in a state in which the spread in the x-axis direction of light is made small by the reflection surfaces, and enters one cylindrical lens 600 corresponding to this light convergence portion 30. That is, reflected light that has been reflected by the reflection surfaces of the light convergence portions 30 is emitted from the emission surface 71 in the state in which the spread in the x-axis direction of light is made small by the reflection surfaces, and enters the cylindrical lenses 600 corresponding to the light convergence portions 30. The cylindrical lenses 600 make the spread in the y-axis direction of reflected light that is received from the corresponding light convergence portion 30 small and emit this light. In this manner, the reflected light is emitted in a state in which its spread is made smaller by the cylindrical lens 600. In particular, the cylindrical lenses 600 make the spread in the y-axis direction of the emitted light small. Accordingly, regardless of the direction in which the user looks at the optical device, the user recognizes light that appears to be substantially emitted from one point in the space. Thus, providing the cylindrical lenses 600 makes it possible to further suppress the influence of blur, warping, or the like of the stereoscopic image.

In this manner, providing the cylindrical lenses 600 makes it possible to further reduce the spread of emitted light. Note that the cylindrical lenses 600 are one example of an emission restriction portion that restricts the spread of light that is guided by the light-guiding plate 70 and emitted from the emission surface 71.

As shown in FIG. 6(b), the sensor 60 detects the object using light extending along the xz plane. That is, the sensor 60 detects the object using light extending along the plane that is orthogonal to the emission surface 71 and parallel to the direction in which the plurality of cylindrical lenses 600 extend. For example, the light projection axis of the light projection portion 61 and the light reception axis of the light reception portion 64 substantially exist in the plane that is orthogonal to the emission surface 71 and parallel to the direction in which the plurality of cylindrical lenses 600 extend. The light projection portion 61 and the light reception portion 64 are provided in correspondence with one cylindrical lens 600. For example, the light projection portion 61 and the light reception portion 64 are provided such that the light projection portion 61, the light reception portion 64, and the apex of the one corresponding cylindrical lens 600, and the range 180 in which the object is detected are substantially located in the plane that is parallel to the direction in which the cylindrical lenses 600 extend. Thus, cylindrical lenses 600 do not significantly affect the detection performance of the sensor 60.

Note that in the operation input apparatus 620, the plurality of cylindrical lenses 600 substantially cover the entire emission surface 71. As another embodiment, the cylindrical lenses 600 are provided in a partial region of the emission surface 71, and a portion of the emission surface 71 need not to be covered by the cylindrical lenses 600.

Figure 7:
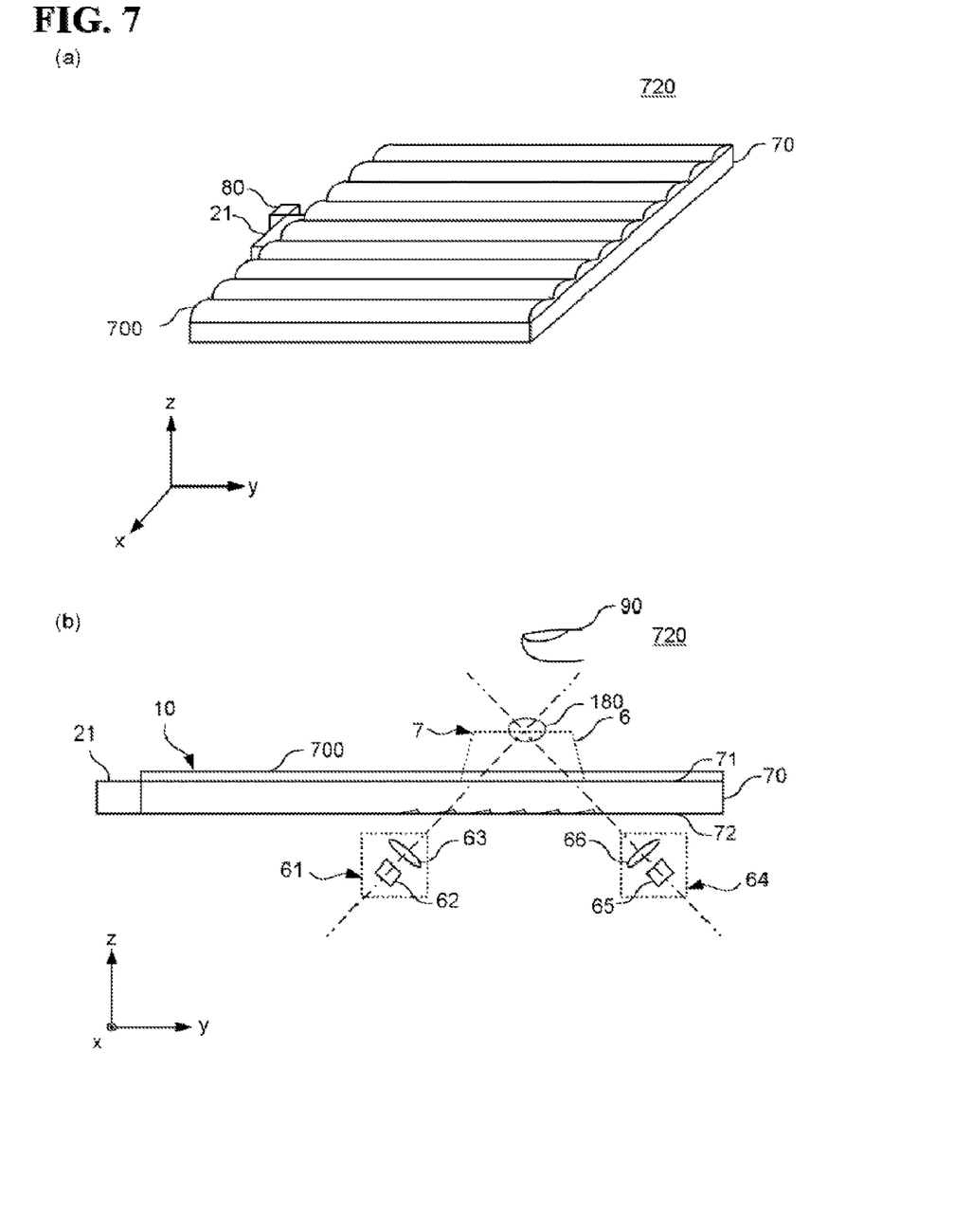
FIG. 7 schematically shows an operation input apparatus 720 as a modification of the operation input apparatus 20.

FIG. 7 schematically shows an operation input apparatus 720 as a modification of the operation input apparatus 20. FIG. 7(a) is a perspective view schematically showing the operation input apparatus 720. FIG. 7(b) is a cross-sectional view of the operation input apparatus 720 in the xz plane.

The operation input apparatus 720 includes cylindrical lenses 700 in addition to the constituent elements included in the operation input apparatus 20. The cylindrical lenses 700 are each provided on the emission surface 71 at a position corresponding to one reflection surface of each of the light convergence portions 30. The cylindrical lenses 700 are each provided at a position corresponding to a plurality of reflection surfaces of each of the light convergence portions 30. The plurality of cylindrical lenses 700 each extend along the y-axis direction. In this manner, the plurality of cylindrical lenses 600 extend along a direction orthogonal to the direction in which the light-guiding plate 70 guides light. The plurality of cylindrical lenses 700 are lined up along the x-axis direction.

Reflected light that has been reflected by the reflection surfaces of the light convergence portions 30 is emitted in the state in which the spread of light is made smaller by the corresponding cylindrical lens 700. In particular, the cylindrical lenses 700 make the spread in the x-axis direction of the emitted light small. Thus, providing the cylindrical lenses 700 makes it possible to further suppress the influence of blur or the like of the stereoscopic image.

In this manner, providing the cylindrical lenses 700 makes it possible to further reduce the spread of emitted light. Note that the cylindrical lenses 700 are one example of an emission restriction portion that restricts the spread in the x-axis direction of the emitted light. If a display unit needs not to have translucency, the spread in the x-axis direction of the emitted light may be restricted by a parallax barrier.

As shown in FIG. 7(b), the sensor 60 detects the object using light extending along the yz plane. That is, the sensor 60 detects the object using light extending along the plane that is orthogonal to the emission surface 71 and parallel to the direction in which the plurality of cylindrical lenses 700 extend. Specifically, the light projection axis of the light projection portion 61 and the light reception axis of the light reception portion 64 substantially exist in the plane that is orthogonal to the emission surface 71 and parallel to the direction in which the plurality of cylindrical lenses 700 extend. The light projection portion 61 and the light reception portion 64 are provided in correspondence with one cylindrical lens 700. For example, the light projection portion 61 and the light reception portion 64 are provided such that the light projection portion 61, the light reception portion 64, and the apex of the one corresponding cylindrical lens 600, and the range 180 in which the object is detected are substantially located in the plane that is parallel to the direction in which the cylindrical lenses 700 extend. Thus, the cylindrical lenses 700 do not significantly affect the detection performance of the sensor 60.

Note that in the operation input apparatus 720, the plurality of cylindrical lenses 700 substantially cover the entire emission surface 71. As another embodiment, the cylindrical lenses 700 are provided in a partial region of the emission surface 71, and a portion of the emission surface 71 need not to be covered by the cylindrical lenses 700.

Figure 8:
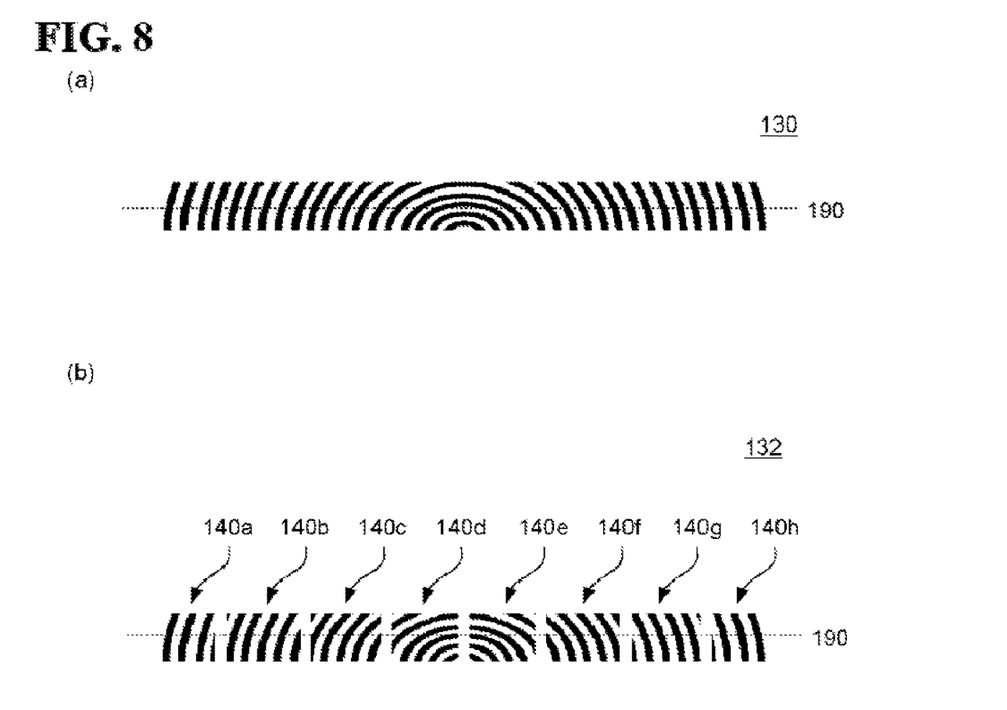
FIG. 8 schematically shows a light convergence portion 130 and a light convergence portion 132 as modifications of a light convergence portion 30.

FIG. 8 schematically shows a light convergence portion 130 and a light convergence portion 132 as modifications of the light convergence portion 30. FIG. 8(a) schematically shows one light convergence portion 130 formed by a portion of a Fresnel lens. Note that a gap may also be provided between a plurality of refracting interfaces (prism planes) of the light convergence portion 130 that functions as the Fresnel lens.

The light convergence portion 132 shown in FIG. 8(b) corresponds to a plurality of portions 140a, 140b, 140c, 140d, 140e, 140f, 140g, and 140h that are obtained by dividing the light convergence portion 130 along the x-axis direction. Light emitted from the portions 140 of the light convergence portion 132 converges at the same fixed point. In this manner, by dividing the light convergence portion into the plurality of portions, a so-called black matrix effect occurs and the contrast of an image increases in some cases. Note that in addition to the reflection surface or the Fresnel lens, a diffraction grating may also be used as the light convergence portion 30.

Although the present invention was described by way of an embodiment, the technical scope of the present invention is not limited to the above-described embodiment. It is clear for a person skilled in the art that various changes or modifications can be added to the above-described embodiment. It is clear from the claims that embodiments to which such changes or modifications are added are also included in the technical scope of the present invention.

Note that the order of executing processes such as operations, procedures, steps, and stages in the apparatus, system, program, and method shown in the claims, specification, and drawings is not clearly stated, such as in particular, "before", "prior to", or the like, and the processes may be realized in any order unless the output of the former process is used in the later process. Even though operation flows in the claims, specification, and drawings are described using "first", "next", or the like for convenience, it does not mean that performing the operation flow in the stated order is essential.

INDEX TO THE REFERENCE NUMERALS

6 Image
7 Partial image
10 Display apparatus
20 Operation input apparatus
21 Light source
30 Light convergence portion
60 Sensor
61 Light projection portion
62 Light emission portion
63 Light projection lens
64 Light reception portion
65 Photosensor
66 Light reception lens
70 Light-guiding plate
71 Emission surface
72 Back surface
73, 74, 75, 76 End surface
80 Control unit
90 Finger
130 Light convergence portion
132 Light convergence portion
140 Portion
180 Range
190 Line
300 Half mirror
320 Operation input apparatus
400 Light-blocking plate
401, 402 Opening
420 Operation input apparatus
600 Cylindrical lens
620 Operation input apparatus
700 Cylindrical lens
720 Operation input apparatus

The invention claimed is:
1. An optical device comprising:
a light-guiding plate that guides light in a plane parallel to an emission surface that emits light; and a sensor for detecting an object located on an emission surface side using light that passes through a back surface opposite to the emission surface and through the emission surface, the sensor being provided on the side opposite to the emission surface with respect to the light-guiding plate, wherein the light-guiding plate has a plurality of light convergence portions provided on the back surface that receive light guided by the light-guiding plate and each of the plurality of light convergence portions has optical surfaces that cause light to be emitted from the emission surface in directions in which the light substantially converges at one convergence point or one convergence line in a space, or substantially scatters from one convergence point or one convergence line in the space, each of the plurality of light convergence portions comprise multiple reflection surfaces that are substantially continuous in an x-axis direction of the back surface, and the convergence points or the convergence lines for the plurality of light convergence portions are different from each other, and an image is formed in the space on the emission surface side by a collection of a plurality of the convergence points or the convergence lines.

2. The optical device according to claim 1,
wherein the plurality of light convergence portions are formed along lines that are determined in advance in the plane parallel to the emission surface.

3. The optical device according to claim 1,
wherein the plurality of light convergence portions form the image showing a position at which a user operation is accepted, in at least one of a detection range in which the sensor can detect an object in the space on the emission surface side, and a vicinity of the detection range.

4. An operation input apparatus comprising:
the optical device according to claim 3; and
a determination unit that determines, if an object located on the emission surface side is detected by the sensor, that the object is located at a position at which the user operation is accepted.

5. The optical device according to claim 1,
wherein the sensor has a light reception portion that receives light from a position in the space on the emission surface side through the emission surface and the back surface.

6. The optical device according to claim 5, wherein
the sensor further comprises a light projection portion that projects light to the space on the emission surface side, through the emission surface and the back surface, and
if the object is present in a predetermined range in a light path of the light projected from the light projection portion to the space on the emission surface side, the light reception portion receives reflected light that has been projected from the light projection portion and has been reflected by the object.

7. The optical device according to claim 6,
wherein the plurality of light convergence portions form the image showing a position at which a user operation is accepted, in at least one of the predetermined range in the space on the emission surface side, and a vicinity of the predetermined range.

8. The optical device according to claim 6, further comprising a light-blocking plate provided between the back surface of the light-guiding plate and the sensor, wherein the light-blocking plate has a plurality of openings provided such that:

a first opening is provided in correspondence with an optical axis of the light path of the light projected from the light projection portion to the space on the emission surface side; and a second opening is provided in correspondence with an optical axis of the reflected light received by the light reception portion that has been projected from the light projection portion and has been reflected by the object.

9. The optical device according to claim 1, further comprising:

a plurality of cylindrical lenses that are provided on the emission surface side of the light-guiding plate at positions corresponding to the plurality of light convergence portions, and each restrict a spread of light emitted from a corresponding light convergence portion, the light having been guided by the light-guiding plate and emitted from the emission surface.

10. The optical device according to claim 9,
wherein the sensor detects the object using light extending along a plane that is orthogonal to the emission surface and parallel to a direction in which the plurality of cylindrical lenses extend.

11. The optical device according to claim 9,
wherein the plurality of cylindrical lenses extend along a direction orthogonal to a direction in which the light-guiding plate guides light.

12. The optical device according to claim 9,
wherein the plurality of cylindrical lenses extend along a direction in which the light-guiding plate guides light.

13. The optical device according to claim 1, further comprising a half mirror provided between the back surface of the light-guiding plate and the sensor, wherein the half mirror is provided such that the light passing through the back surface for use by the sensor also passes through the half mirror.

* * * * *

UNITED STATES PATENT AND TRADEMARK OFFICE
CERTIFICATE OF CORRECTION

PATENT NO. : 10,338,749 B2
APPLICATION NO. : 15/538842
DATED : July 2, 2019
INVENTOR(S) : Norikazu Kitamura et al.

It is certified that error appears in the above-identified patent and that said Letters Patent is hereby corrected as shown below:

On the Title Page

Item (30) Foreign Application Priority Data should be inserted as shown below:
--(30) Foreign Application Priority Data
Sep. 14, 2015 (JP).....................................2015-180912
Jan. 13, 2015 (JP).....................................2015-004535--

Signed and Sealed this
Twenty-seventh Day of August, 2019

Andrei Iancu
*Director of the United States Patent and Trademark Office*